73-658 SR
XR 2,958,786
SEARCH ROOM
SUBSTITUTE FOR MISSING XR
CROSS REFERENCE

Nov. 1, 1960 E. G. MILLIS 2,958,786

TRANSISTOR TRANSDUCER

Filed Dec. 16, 1955 3 Sheets-Sheet 1

INVENTOR
Edwin G. Millis

BY Stevens, Davis, Miller and Mosher
ATTORNEYS

Nov. 1, 1960 E. G. MILLIS 2,958,786

TRANSISTOR TRANSDUCER

Filed Dec. 16, 1955 3 Sheets-Sheet 2

INVENTOR
Edwin G. Millis

BY Stevens, Davis, Miller and Mosher
ATTORNEYS

INVENTOR
Edwin G. Millis

BY Stevens, Davis, Miller and Mosher
ATTORNEYS

United States Patent Office 2,958,786

Patented Nov. 1, 1960

2,958,786

TRANSISTOR TRANSDUCER

Edwin G. Millis, Dallas, Tex., assignor to Texas Instruments Incorporated, Dallas, Tex., a corporation of Delaware Filed Dec. 16, 1955, Ser. No. 553,556

11 Claims. (Cl. 250—232)

This invention relates to devices for changing mechanical movements into corresponding electrical currents, and particularly to devices utilizing a photo-transistor for that purpose.

There are many situations in which it is desirable to convert small mechanical movements into corresponding electrical currents and often it is quite important that this be done without interposing any appreciable resistance to the mechanical movements. It is also highly desirable, in general, that the electrical currents produced as a result of the mechanical movements be accurate representations of the movements, unencumbered by any spurious currents. To accomplish these objectives, conventional photo-cells are quite often used. However, conventional photo-cells are much too large for many applications.

It is now well-known that a p-n junction in a body of semiconductor material is sensitive to light in that its electrical resistance is affected by the intensity of light incident on the junction. The photo-sensitive property of semi-conductor material has been put to practical use in the photo-transistor. Photo-transistors are generally of approximately the same configuration as the conventional triode transistors which comprise a small single crystal element of semiconductor material having a narrow region of one conductivity type between two regions of an opposite conductivity type. The photo-transistor, however, instead of electrical connections to all three regions as in the triode transistor, has electrical connections only to the two outside or end regions, known as the emitter and collector. In the photo-transistor, the control function is provided by light incident on the base layer of the element which light is admitted by a small window in the can or enclosure of the unit. Thus, the incident light replaces the electrical signal impressed on the third connection, i.e. the connection to the base layer, used as the controlling means in the ordinary triode transistor. The advantage in using a photo-transistor rather than a simple p-n junction lies in its greater sensitivity arising from the amplifier action of the double junction transistor structure. Although specific reference is made throughout the following description to a device employing the double junction or transistor type photo-sensitive element, it is to be understood that the invention disclosed herein may equally well employ a single p-n junction semiconductor bar as the photo-sensitive element.

Previous attempts to make use of photo-transistors in applications where the use of other photo-sensitive devices was prohibited by their relatively large size have met with but little success. The reason for this has been the added structure necessary to adjust and hold the alignment required between the photo-sensitive region of the semiconductor element, the enclosure window, the light source and the light modulating element which has nullified the advantage residing in the small size of the photo-transistor.

The device of the present invention overcomes this disadvantage by providing an extremely small transducer in which the light modulating elements are contained within the photo-transistor enclosure itself and are permanently adjusted, aligned and fixed in place between the enclosure window and the photo-sensitive region of the transistor bar, in close proximity to the latter.

The transducer of this invention is especially well suited for use as a phonograph pickup, and it is also suitable for use as a microphone and in various measuring devices and gauges.

One of the objects of this invention is to provide an extremely small transducer for changing small mechanical movements into corresponding electrical currents, in which the mass of the parts that must move in order to operate the device is relatively quite low, thus reducing errors due to inertia of the moving mass.

Another object of this invention is to provide a device of this type in which the output voltage is relatively high and the impedance of the device is relatively low.

Still another object of this invention is to produce a device of this type that is of such a nature that it can be caused to respond to vibrations along a selected axis and be comparatively insensitive to vibrations along a different axis.

Still another object of this invention is to provide a device of this type that is self-damping, and hence a device which will not generate spurious oscillations.

Yet another object of this invention is to produce a device of this type in which the electrical output is linear with respect to the amplitude of mechanical movement over a considerable range of amplitudes.

Still another object of this invention is the production of a device of this type in which the output is relatively independent of frequency over a relatively wide range of frequencies.

The transducer of this invention is useful as a high fidelity phonograph pickup, a pickup for a vibration analyzer, the transducer in an accelerometer, microphone or geophone, or a transducer for changing mechanical movement to electrical current in any of a variety of measuring devices, weighing devices, and gauges.

In brief, the transducer of this invention consists of a junction transistor, a light source arranged to illuminate the intermediate or base layer of the transistor, a flag which governs the amount of light reaching the intermediate layer in accordance with the mechanical movements to be changed into electrical currents, and the necessary mechanical connections to move the flag in accordance with these mechanical movements and circuitry for supplying current to the light source and operating the transistor so as to obtain a current flow therethrough proportional to the light falling thereon.

There is no practical limit to the number of different mechanical arrangements that may be used in accordance with the principles of this invention, but the principles will be apparent and the possible variations obvious from a consideration of the following detailed description of several typical examples, as illustrated in the appended drawings.

Figure 1:
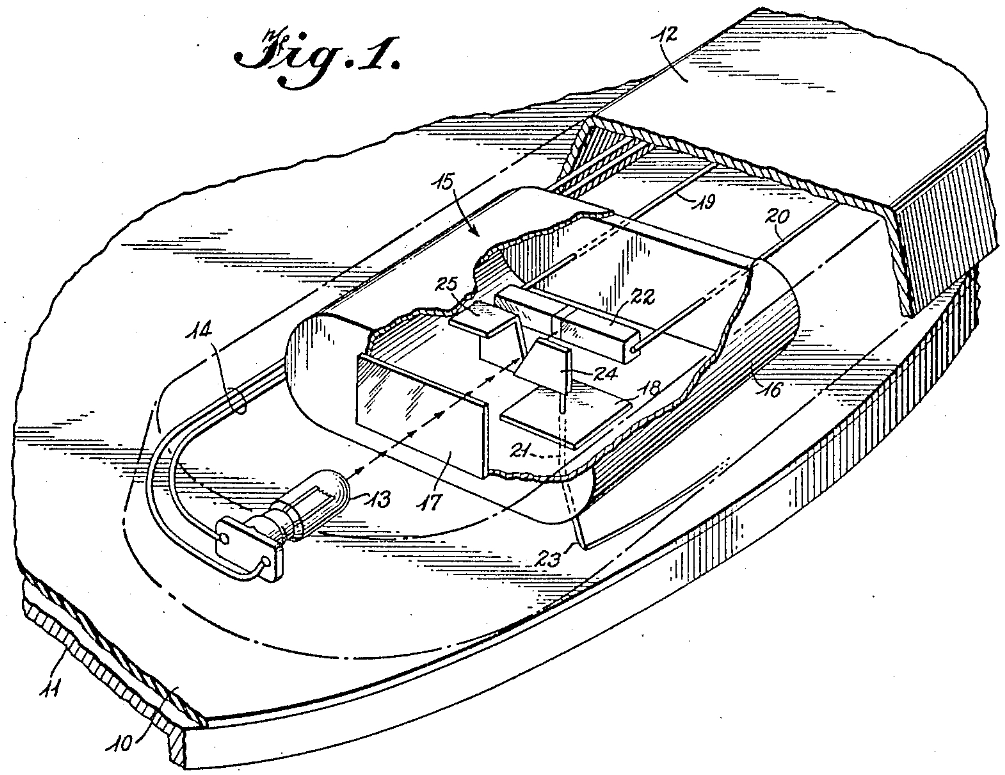
Figure 1 is a perspective view of the end of a phonograph arm and a part of a phonograph record, with certain parts being cut away to show more thoroughly the manner in which the principles of this invention may be utilized in the construction of a phonograph pickup.

As illustrated in Figure 1, *a* phonograph record 10 is supported and rotated upon a phonograph turntable 11, and a phonograph arm 12 extends out over the phonograph record in the usual manner and carries the necessary mechanism for picking up vibrations from the grooves on the record and converting them into corresponding electrical vibrations. The phonograph arm 12 has the usual solid top and sides and open bottom.

In accordance with this invention, a small electric light bulb 13 is mounted in the hollowed out underside of the phonograph arm 12 near the front end thereof, and is connected by suitable wires 14 extending rearwardly through the phonograph arm to a suitable source of direct electrical current, not shown. A short distance rearwardly of the light bulb 13, a phonograph cartridge generally designated as 15 is also mounted in the hollowed out underside of the phonograph arm 12. This pickup cartridge 15 consists of an outer shell 16 carrying a transparent window 17 and a flexible metal plate 18 and electrical leads 19 and 20, all hermetically sealed in position.

The transparent window 17 is positioned at the forward end of the case 16 in such a position as to admit light from the light bulb 13. The flexible metal plate 18, which is preferably made of about 0.005 inch thick hard brass, is sealed tightly into the bottom of the can 16 and serves to support a staff 21 which extends through the center of the flexible plate, for the purpose of conducting mechanical movements from the outside through the plate into the inside of the can 16.

The two electrical connections 19 and 20 are sealed into the can 16, but insulated therefrom, preferably by a glass-to-metal hermetic seal. The two leads 19 and 20 serve both as electrical connections and also as a support for a junction transistor element 22, which is connected between them inside of the can 16. Preferably, the junction transistor element is of germanium and is of the n-p-n grown junction type, and is about 0.030 inch square by about 0.2 inch long. The transistor element may, if preferred, be of the p-n-p type, and it may be made from silicon or other semiconductor material instead of germanium.

As illustrated in Figure 1, the lower end of the staff 21 is brought to a point at 23 and is preferably made of some very hard material so that it can serve as the point or stylus of the phonograph pickup. As shown in Figure 1, it rests in the groove of the record 10, and thus picks up the vibrations caused by the movement of the groove under the end of the needle.

The upper end of the staff 21 carries a flag 24 which cooperates with a fixed shield 25, attached to the case 16, so as to admit more or less light from the window 17 to the intermediate or base layer of the transistor 22. As can be seen in Figure 1, the overlapping edges of the movable flag 24 and the fixed shield 25 are angled to each other so that a V-shaped slot results between the two, thus causing a gradual cutting off of the light to the intermediate layer of the transistor as the flag 24 moves toward the shield 25. It should be understood that these two edges can be parallel, thus causing a sharper cutoff of light, if desired, or the patterns of these two edges may be varied so as to produce any desired relationship between the transverse movement of the flag 24 and the rate of cutoff of the light to the intermediate layer of the transistor. In other words, both edges may be slanted; one edge may be straight and the other may be slanted; one edge may be straight and the other curved; both may be curved; or one may be curved and one may be slanted. By properly selecting the shapes of the two cooperating edges, compensation may be made for the characteristics of the pickup itself, for the characteristics of the records to be played, or for the characteristics of the electrical circuits that follow. The can which encloses the flag 24 and the transistor bar may desirably be filled with an insulating and damping liquid, such as a transparent oil of a viscosity suitable to the frequency response required of the device.

Figures 2, 4, 5:
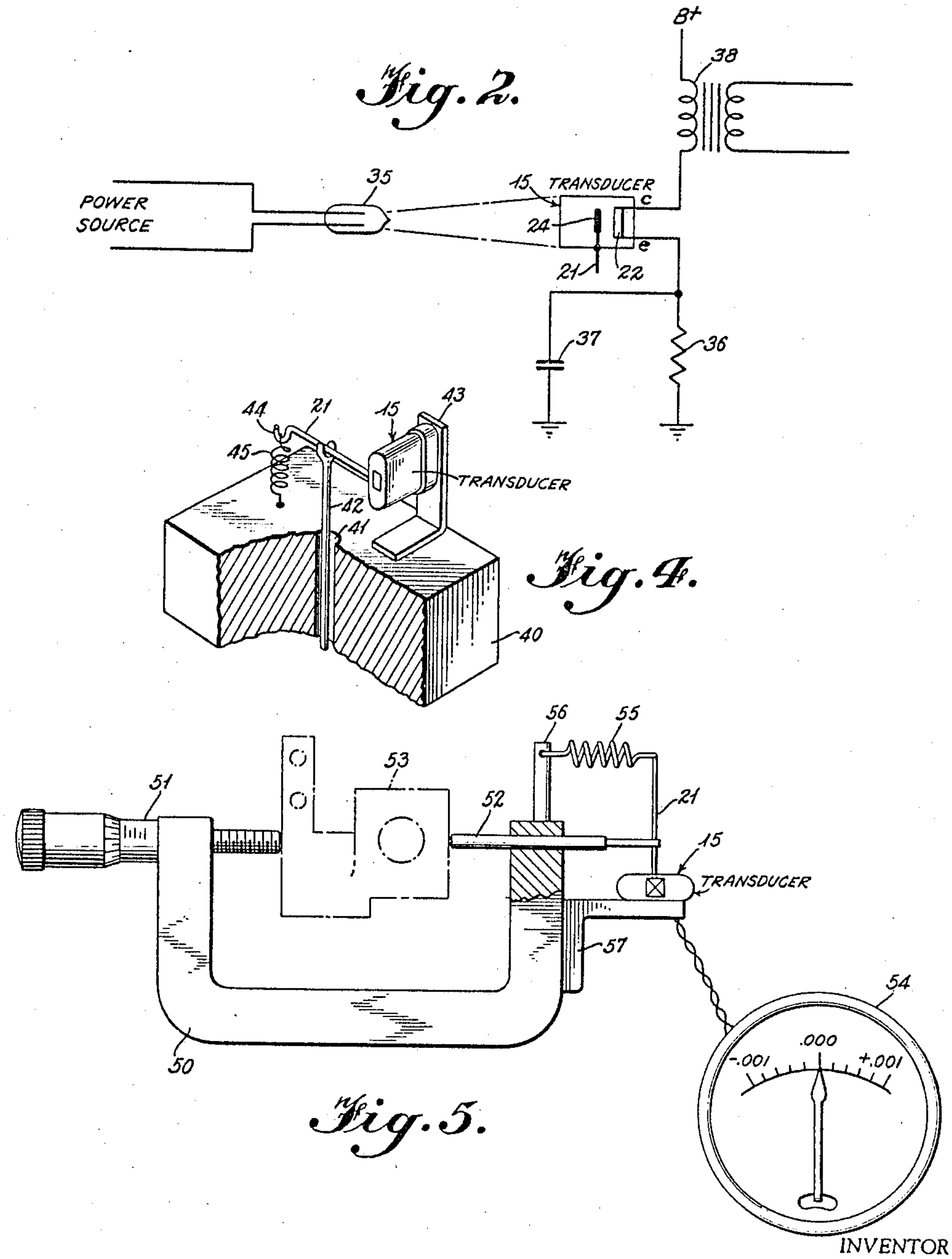
Figure 2 is a circuit diagram illustrating the manner in which the principles of this invention may be utilized.
Figure 4 is a perspective view, with certain parts partly cut away, showing the use of the principles of this invention in a surface roughness indicator.
Figure 5 is a side elevational view of a device using the principles of this invention in a micrometer type tolerance gauge, certain parts being cut away to show the operation more clearly.

Referring now to Figure 2, there is shown schematically a circuit for using the transducer of this invention. In the circuit shown in Figure 2, a lamp 35 is supplied with current from a source (not shown). The light is allowed to fall on a transducer 15 of the type already described. Since the resistance of the semiconductor element is a function of the light incident thereon, that resistance now depends upon the position of the staff 21 and its flag 24.

The circuit into which the transistor 22 is connected consists of a resistor 36 connected to one end of the transistor and to ground and a bypass condenser 37 connected across the resistor. The other end of the transistor is connected through the primary of an output transformer 38 to a source of potential (not shown) which is negative for p-n-p types or positive, as indicated, for n-p-n types of transistors. An output signal will be induced in the secondary of the transformer 38 by changes in the D.-C. current in its primary or by A.-C. current in the primary. These output signals may be introduced into a suitable amplifying or indicating device (not shown) and then indicated or recorded in the usual manner.

It is generally necessary and desirable to utilize a light source operated from direct current when the transducer is to be used as a phonograph pickup or as the microphone pickup or surface roughness gauge described below in order to avoid the introduction of unwanted alternating current into the output. This is not true when the device is used for some other purposes, and, in fact, it is desirable to introduce an alternating current and thus to give the device an alternating current output of varying amplitude when the transducer is to be used to convert small mechanical movements into small direct currents, or even slowly alternating currents. In such cases, the introduction of an alternating current carrier simplifies the problem of amplification materially. Such an alternating current carrier is introduced into the system when the lamp 35 is a neon or other flashing type lamp supplied from an alternating current source such as the 110 volts 60 cycles. Such a light source will produce an alternating current in the primary of transformer 38 at a frequency equal to the flashing rate of the light and of an amplitude dependent upon the position of the flag 24.

Figure 3:
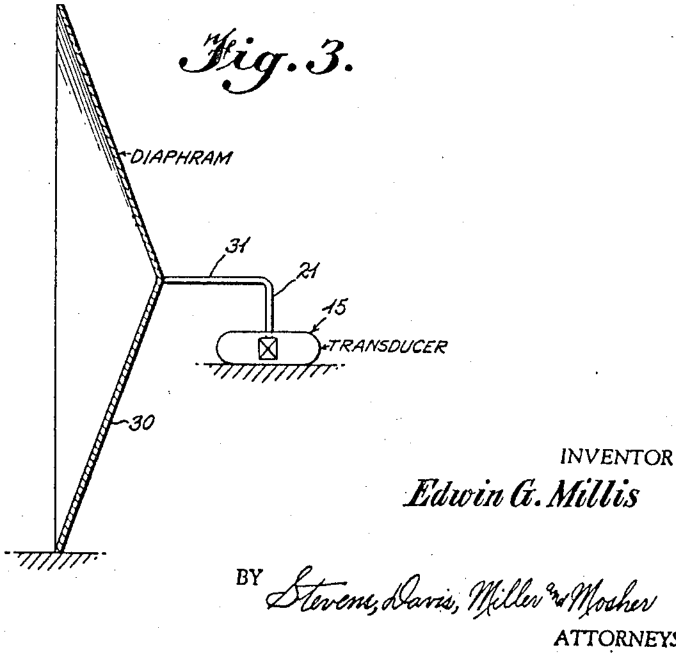
Figure 3 is a schematic illustration, partly in section, showing how the principles of this invention may be incorporated in the construction of a microphone.

Passing now to Figure 3, there is shown a very simple illustration of the same type of transducer, that is, the device that was in the phonograph pickup of Figure 1, used as a microphone. For this purpose, a microphone diaphragm 30 is simply connected through a connecting link 31 to the staff 21 of a transducer which we have generally designated as 15, as was done in the case of the transducer of Figure 1. Again, as in Figure 1, a light bulb operating on direct current (not shown) is provided. And again, as in Figure 1, the output is fed into a circuit (not shown) for amplification and further use.

A circuit such as is illustrated in Figure 2 with a D.-C. light source, may be used to advantage with a device such as is illustrated in Figure 4 for determining the surface roughness of a machine element or some other surface that it is desired to test. The device of Figure 4 consists of a flat-bottomed steel block 40 adapted to slide over the surface to be checked, and this block is provided with a vertical opening 41 through which extends a probe 42, arranged to contact the surface under test and move up and down in accordance with the roughness of that surface. Mounted on top of the block 40 is a supporting angle 43 carrying a transducer unit 15 of the type already described. The staff 21 of this transducer unit extends horizontally and ends with a hook 44, which is pulled downwardly toward the block by a spring 45 attached to the hook and to the block. The upper end of the probe 42 is U-shaped and the staff 21 rests in the upper end of the probe and presses downwardly against it, thus pressing the probe against the surface under investigation, and at the same time causing the staff 21 to move as the roughness moves the probe 42. There is, as mentioned, a light source such as the one indicated at 35 in Figure 2, but this and the circuitry of Figure 2 have been omitted for clearness.

Using the circuit of Figure 2 in the device of Figure 4, the output of the transformer 38, either with or without amplification may be indicated on a meter or recorded on a recorder as an indication of the roughness of the material under investigation.

Another illustration of the manner in which the principles of this invention may be applied is illustrated in Figure 5. In Figure 5, a U-shaped frame member 50 carries a micrometer screw 51 in one of the legs of the U, and opposite this micrometer screw, in the other leg of the U, there is slidably mounted a probe 52. The micrometer screw 51 may be set for any desired measurement and a part such as the part 53 shown in dotted lines may be moved into position between the end of the micrometer screw 51 and the end of the probe 52 so as to determine its size. The opposite end of the probe 52 is pivotally connected to the staff 21 of a transducer 15 and the transducer 15 is then connected, with or without amplification, to a meter 54, which indicates the position of the flag attached to the staff 21 of the transducer. The staff 21 of the transducer will ordinarily be connected by a spring 55 to a post 56 attached to one of the legs of the U-shaped frame member. The transducer may be mounted on an angle bracket 57 also attached to the leg of the frame member 50.

The device of Figure 5 may be used by placing the part to be checked between the micrometer screw in the probe and then adjusting the micrometer screw until the meter 54 reads zero, and then reading the micrometer screw. Alternatively, it may be used by adjusting the micrometer screw to the desired dimension of the part to be checked and then placing the part to be checked in position and reading the meter to find out whether or not the part to be checked is of the proper size, or, if not, whether or not it is within the permitted tolerance. In this manner, the micrometer screw can be set once and tightened in position, and many parts can be checked without readjustment.

Figure 6:
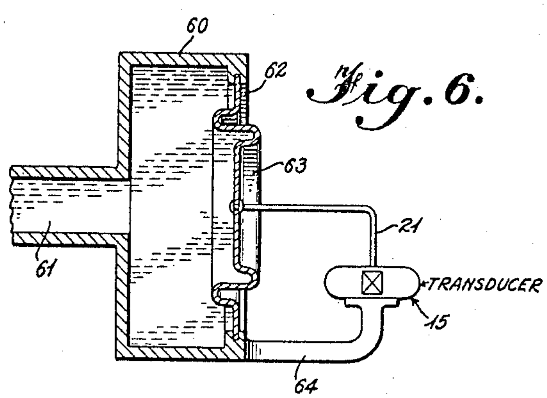
Figure 6 is a similar view showing the principles of this invention utilized in the construction of a pressure gauge.

The principles of this invention may also be used in the measurement of air, gas or liquid pressure, as illustrated in Figure 6. In Figure 6, a chamber 60 is provided, and liquid or gas under pressure is introduced into an entrance opening 61 therein. Another and larger opening 62 is closed by a diaphragm 63, and to the center of this diaphragm 63 is connected the staff 21 of a transducer 15. The transducer may be mounted on the arm 64 which extends from the chamber 60. The circuit connections for the transducer 15 are not shown, since they would be the same as for the previous device.

Figure 7:
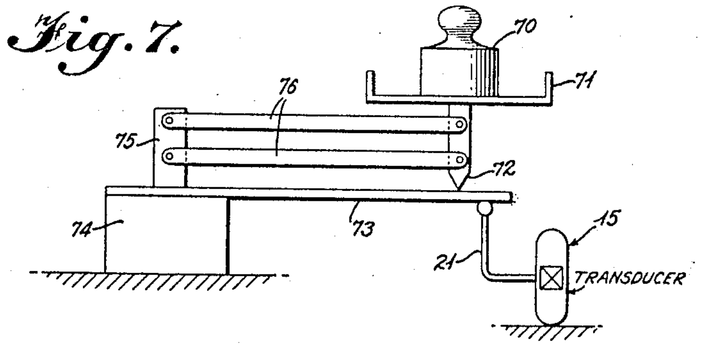
Figure 7 is a similar view showing the principles of this invention used in a weighing device.

A very convenient scale for weighing a large number of articles, all of which are intended to weigh approximately the same, may be constructed as shown in Figure 7. In this figure, the object 70 to be weighed is supported upon a scale pan 71, the weight of which is carried on a knife edge 72, which rests upon a cantilever spring 73, which is, in turn, supported from a block 74 upon which it is mounted. A post 75 and links 76 prevent the scale pan from tilting. The end of the cantilever spring 73 may be connected to the staff 21 of a transducer 15 of the type already described, and the electrical circuitry may be the same as that illustrated in Figure 2.

Figure 8:
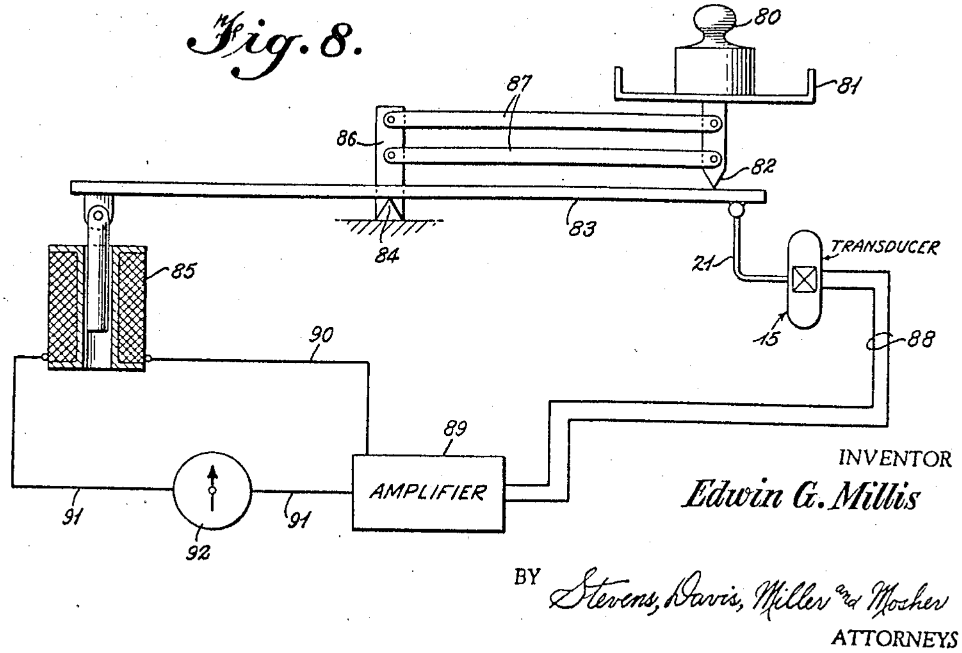
Figure 8 is a similar view showing the principles of this invention used in the weighing device in which an amplifier and a feed-back circuit are used to operate a solenoid to bring the weighing device into balance.

A slightly more elaborate scale arrangement may be provided for weighing objects having different weights, as illustrated in Figure 8. In Figure 8, the object to be weighed 80 is supported upon a scale pan 81, which in turn, is supported on a knife edge 82 resting upon a scale beam 83. The scale beam is fulcrumed at 84 and balanced by the pull of a solenoid 85 attached to its opposite end. The scale pan 81 is prevented from tipping by a post 86 and links 87, as before. The end of the scale beam 83 adjacent the scale pan 81 is connected to the staff 21 of a transducer 15 of the type heretofore described, and preferably utilizing the alternating current circuitry of Figure 2. The output of the transducer is connected through conductors 88 to an amplifier 89, which is arranged to supply an output current through conductors 90 and 91 sufficient to energize the solenoid 85 and bring the beam 83 back into a state of balance. The amount of current required to effect this balance is indicated on a meter 92 in the lead 91 between the amplifier and the solenoid. As a result of this arrangement, the weight of the article 80 is indicated directly on the meter 92.

It will at once be apparent that the foregoing examples represent but a few of the many possible arrangements that may be easily devised to achieve the advantages of the novel transducer of this invention, and the transducer, its alternating circuitry, and all of these various arrangements for their use are considered to be within the scope of this invention and the appended claims.

What is claimed is:

1. A transducer for converting mechanical movements into corresponding electrical currents that comprises a junction transistor bar, a light source illuminating the intermediate layer of said transistor bar, a shutter for controlling the amount of light passing from said light source to said intermediate layer, a mechanical connection for conveying the mechanical movements to the shutter, an electrical circuit for sensing the changes in conductivity of the transistor bar, and a hermetically sealed casing enclosing the transistor bar and the shutter and having a hermetically sealed window therein through which light from the light source may enter, and a hermetically sealed diaphragm through which the mechanical connection enters, and hermetically sealed electrical connections through which the electrical circuit may connect to the transistor bar, said junction transistor bar and said shutter both being supported by said casing.

2. A transducer as defined in claim 1 in which the hermetically sealed casing is filled with an insulating and damping liquid.

3. A transducer for converting mechanical movements into corresponding electrical currents that comprises a junction transistor bar, a light source positioned to illuminate the intermediate layer of said transistor bar, a shutter for controlling the amount of light passing from said light source to said intermediate layer and comprising a fixed light shield and a movable light shield cooperating to form a shutter, said movable light shield overlapping said fixed light shield to cut off light from said light source directed toward the said intermediate layer of said transistor bar, the overlapping edges of said fixed and said movable light shields forming a V as they overlap, a mechanical connection for conveying mechanical movements to said movable light shield, an electrical circuit for sensing the changes in conductivity of said transistor bar, and a casing enclosing and supporting said transistor bar and said shutter.

4. A device for converting the mechanical movements of a mechanical sensing element into corresponding electrical currents comprising in combination a sensing element and a transducer, said transducer comprising a junction transistor bar, a light source illuminating the intermediate layer of said transistor bar, a shutter for controlling the amount of light passing from said light source to said intermediate layer, a mechanical connection between said shutter and said sensing element to cause movement of said shutter in response to the movement of at least a portion of said sensing element, an electrical circuit for sensing the changes in conductivity of said transistor bar, a hermetically sealed casing enclosing said transistor bar and said shutter and having a hermetically sealed window therein through which light from said light source may enter, a hermetically sealed diaphragm through which said mechanical connection enters, and hermetically sealed electrical connections through which said electrical circuit may connect to said transistor bar, said junction transistor bar and said shutter both being supported by said casing.

5. A transducer according to claim 1 wherein said light source is operable on alternating current.

6. A device according to claim 4 wherein said transducer is located in the end of a phonograph pickup arm and wherein said sensing element includes a phonograph stylus.

7. A device according to claim 4 wherein said sensing element includes a pressure sensitive diaphragm.

8. A device according to claim 4 wherein said sensing element includes a flat-bottomed block adapted to slide over a surface, the roughness of which is to be tested, a vertically extending probe mounted for vertical reciprocation in said block and extending from a point above said block to a point adjacent the lower surface of said block where it is adapted to contact the surface to be tested and sense the roughness therein, said probe being connected to said shutter.

9. A device according to claim 4 wherein said sensing element includes a U-shaped micrometer frame, a micrometer screw in one of the legs of said frame, a rod-shaped probe mounted slidably in the other leg of said U-shaped frame opposite to said micrometer screw, said probe being connected to said shutter by means of said mechanical connection.

10. A device according to claim 4 wherein said sensing element comprises yieldable support means for supporting an object to be weighed.

11. A device according to claim 10 wherein said electrical circuit includes electrical means connected to said yieldable support means for applying force to said support means to balance the weight of an object to be weighed which is supported by said support means, said electrical circuit also including means to control said electrical means for applying corrective force to said yieldable support means and a meter connected to said electrical means to indicate the amount of current flowing in said electrical means.

References Cited in the file of this patent

UNITED STATES PATENTS

| | | |
|---|---|---|
| 958,181 | Schloemilch | May 17, 1910 |
| 1,005,883 | Roch et al. | Oct. 7, 1911 |
| 1,796,239 | Byles | Mar. 10, 1931 |
| 2,067,741 | Weckerly | Jan. 12, 1937 |
| 2,122,818 | Ladrach | July 5, 1938 |
| 2,202,060 | Mitchell | May 28, 1940 |
| 2,348,660 | Stephan | May 9, 1944 |
| 2,376,234 | De Castro | May 15, 1945 |
| 2,466,846 | Giesler | Apr. 12, 1949 |
| 2,497,770 | Hanson | Feb. 14, 1950 |
| 2,503,023 | Berry | Apr. 4, 1950 |
| 2,514,081 | McIlvaine | July 4, 1950 |
| 2,629,005 | Engelhard | Feb. 17, 1953 |
| 2,641,713 | Shive | June 9, 1953 |
| 2,666,650 | MacDonnel | Jan. 19, 1954 |
| 2,733,598 | Miner | Feb. 7, 1956 |
| 2,749,488 | Mayer | June 5, 1956 |